United States Patent [19]

Undén et al.

[11] Patent Number: 4,673,606
[45] Date of Patent: Jun. 16, 1987

[54] LOAD-INTRODUCING ARMATURE AS COMPONENT PART OF A LAMINATED STRUCTURAL ELEMENT

[76] Inventors: Harald Undén, Essingekroken 6-8, S-112 65, Stockholm; Sven-Olof Ridder, Tykövägen 4B, 181 61, Lidingö, both of Sweden

[21] Appl. No.: 786,961

[22] PCT Filed: Feb. 13, 1985

[86] PCT No.: PCT/SE85/00074
§ 371 Date: Oct. 2, 1985
§ 102(e) Date: Oct. 2, 1985

[87] PCT Pub. No.: WO85/03683
PCT Pub. Date: Aug. 29, 1985

[30] Foreign Application Priority Data

Feb. 14, 1984 [SE] Sweden ................................. 8400791

[51] Int. Cl.$^4$ ............................ B32B 3/10; B64C 1/00
[52] U.S. Cl. .................................... 428/138; 428/107; 244/133; 156/252
[58] Field of Search ....................... 428/107, 137, 138; 244/123, 133; 156/252, 256

[56] References Cited

U.S. PATENT DOCUMENTS 3,082,515  3/1963  Rappleya et al. .................... 244/123
4,228,976  10/1980  Eiselbrecher et al. .
4,274,901  6/1981  Elber .
4,603,071  7/1986  Wehnert et al. ..................... 428/137

FOREIGN PATENT DOCUMENTS 2455810  2/1977  Fed. Rep. of Germany .
 604404  7/1948  United Kingdom .
1214858  12/1970  United Kingdom .
1485361  9/1977  United Kingdom .

Primary Examiner—John E. Kittle
Assistant Examiner—James J. Seidleck
Attorney, Agent, or Firm—Witherspoon & Hargest

[57] ABSTRACT

Load-inducing armature adapted to be assembled with layers of fiber-reinforced plastic matrix to form a laminated structural element, whereby the portion of the armature intended to be embedded between plastic matrix layers is provided with through-holes having larger opening width than depth. In a completed laminated structural element pegs consisting of or amalgamatable with the matrix material connect the embedding plastic matrix layers through the holes in the armature for the introduction of load via the armature to the structural element with both ends of each peg subject to shearing stress.

9 Claims, 2 Drawing Figures

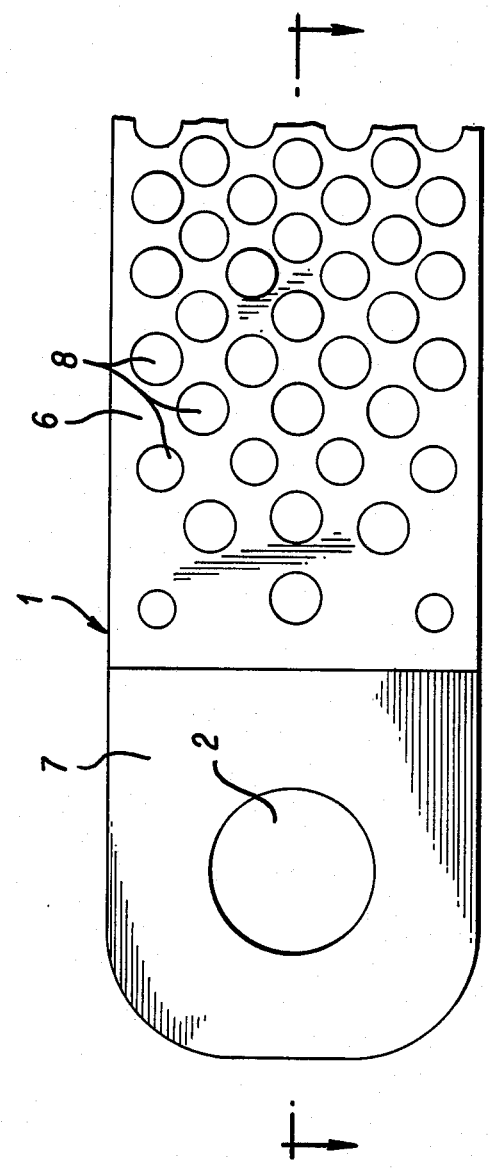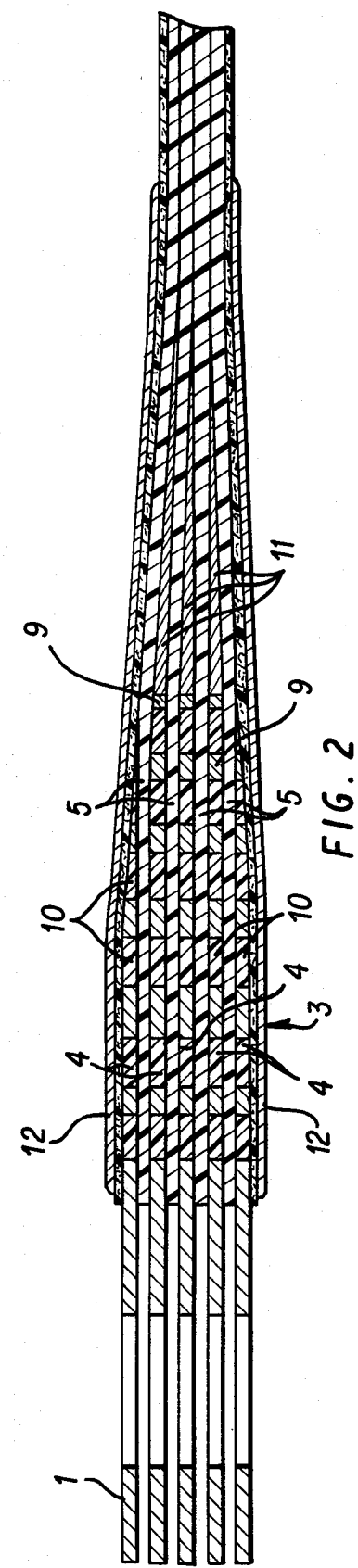

LOAD-INTRODUCING ARMATURE AS COMPONENT PART OF A LAMINATED STRUCTURAL ELEMENT

BACKGROUND OF THE INVENTION

The invention relates to a load-introducing armature adapted to be embedded between layers of fibre-reinforced plastic matrix to form a laminated structural element.

It is the purpose of the invention to improve the introduction of load into fibre-reinforced plastic structures. Such plastic structures may be manufactured to have very high weight-specific strength values and/or rigidity values (E-module values). In many cases difficulties arise in constructing and manufacturing a load-introducing armature which by exploiting the high weight-specific strength value of the fibre composition yields a satisfactory result as far as weight and strength is concerned. A typical example is the wing spar of an aeroplane where the heavy loads substantially comprise pressure or tensile loads in the main direction of the fibre-reinforcement.

In such wing spars the load-introducing means comprise a number of thin plates, preferably of metal such as steel/aluminum intercalated between layers of laminate. As the glueing capacity between plastic laminate and plain metal surfaces often is insecure and always difficult to verify and control it is the purpose of the invention to improve the cohesion between armature plates and adjacent layers of fibre-reinforced plastic matrix, the invention being characterized in that the portion of each armature embedded between plastic layers is provided with a plurality of holes having larger opening width than depth. Through these holes plastic matrix layers on either side of the armature plate are mutually connected by pegs consisting of or amalgamatable with the matrix material and completely filling the holes in the armature. When the armature is exposed to load these pegs are subject to shearing stress. Due to the large opening width of the holes in relation to their depth the cross-sectional area of the pegs when subject to shearing stress will be very large, both ends of each peg carrying load. In this way the shearing load acting on the pegs will be very moderate even near the breaking load of the armature.

The provision of a plurality of holes in each armature plate in accordance with the invention in addition gives the possibility to bring about, by a reduction of the spacing between the holes in the direction away from the point of load-introduction on the armature, a gradual transition between the superior stiffness of the armature (as a rule steel or hard aluminum alloy) and the lower stiffness of the adjacent laminate. By a suitable dimensioning of the total hole area in relation to the surrounding material of the armature it is thus easy to gradually increase the resilience of the metal so that the armature near the transition zone between the armature and the laminate has a stiffness in close agreement with that of the laminate. Thus the armature may be specifically adapted to a certain laminate or vice versa.

The characteristic properties of an armature and a laminated structural element according to the invention will appear from the attached claims.

BRIEF DESCRIPTION OF THE DRAWINGS

Hereafter the invention will be described in greater detail by reference to the attached drawings in which FIG. 1 is a plan view of an armature plate according to the invention and FIG. 2 is a sectioned side view of a laminated structural element comprising five aramature plates according to FIG. 1 embedded between layers of fibre-reinforced plastic matrix.

DETAILED DESCRIPTION OF THE INVENTION

An armature 1 comprising a plate of steel or hard aluminum alloy having a thickness of about 2 mm is intended to be combined in the way shown in FIG. 2 with layers 4, 5 of fibre-reinforced plastic matrix to constitute a laminated structural element 3. Part 7 of armature 1 which in the laminated structure element is positioned outside the plastic matrix layers 4, 5 is provided with a coupling hole 2 adapted to receive a mounting bolt or the like.

The portion 6 of the armature 1 embedded within the laminated structural element 3 is provided with through-holes 8 having larger opening width than depth.

Suitably, holes 8 are provided in a pattern having decreasing spacing between the holes in the direction away from the coupling hole 2.

Hereby a continously increasing degree of resilience in the direction away from the coupling hole 2 towards the embedded end of the armature is achieved. An additional improvement in resilience, to conform more closely to that of the fibre-reinforced plastic layers, is obtained by the staggering of the holes in adjacent rows, as shown in the drawing.

As shown in FIG. 2, it is advantageous that in such armatures which in the laminated element 3 are positioned closest to the surface, the edge portion 9 at the end opposite to the coupling hole 2 may be bevelled. The purpose of this is to permit positioning of the reinforcing fibres during assembly or lamination in such a way that abrupt changes in the direction of the reinforcing fibres within the laminate and thereby a deterioration of the strength properties of the laminate are avoided.

When the armature 1 is combined with layers 4, 5 of the plastic matrix to form the element 3 according to FIG. 2 it is necessary in accordance with the invention that the matrix material or a material amalgamatable therewith forms the pegs 10 which connect the embedded plastic matrix layers 5 through the holes 8 in the armature 1 for the introduction of load via the armature to the element 3 with both ends of each peg 10 being subject to shearing stress. Obviously, each hole 8 in each of the five armature plates according to FIG. 2 is filled with such a peg 10. While pegs 10 may be constituted of portions of the material of adjacent plastic matrix layers 4, 5 pressed into the holes 8, it is preferred, for obtaining a complete filling of holes 8, to form the pegs 10 of a plastic material amalgamatable with the matrix material and introduced into holes 8 during assembly prior to the lamination.

As shown in FIG. 2 the end surfaces of the three intermediate armature plates are straight. To avoid abrupt changes of the direction of extension of the reinforcing fibres in adjacent plastic matrix layers 5 and thereby to avoid deterioration of the strength properties of the laminate, wedges 11 are inserted in continuation to the free end surfaces of these armatures 1 to extend between adjacent fibre-reinforced plastic matrix layers 5 and having their base in conforming contact with the end surfaces of the armature plates 1 in question.

In order to counteract any cleaving tendency of the finally lamintated structural element under the action of stresses acting in directions different from the stresses predominantly taken into consideration, the finished laminate with embedded armature or armatures 1 may be enclosed by a protective collar 12 as shown in FIG. 2.

A laminated structural element of the type shown in FIG. 2 having five plates of steel embedded between outer layers 4 and inner layers 5 of fibre-reinforced plastic matrix was exposed to a test load causing the metal to crack in the mounting hole at a load in excess of 20 tons while no fault could be observed as far as the coherence of the laminated part is concerned.

What we claim is:

1. A laminated structural element (3) composed of layers of fibre-reinforced plastic matrix and at least one load-introducing armature (1) at least partly embedded between the layers, each armature having at least one coupling hole each, characterized in that the portion of the armature embedded between said plastic matrix layers is provided with through-holes distributed over the surface of the armature, said through holes having larger opening width than depth and that pegs compatible with the matrix material connect the embedding plastic matrix layers through the holes in each armature (1) for the introduction of load via the armature to the structural element with both ends of each peg subject to shearing stress.

2. Structural element as claimed in claim 1, characterized in that the pegs are constituted of portions of the material of adjacent plastic matrix layers pressed into the holes.

3. Structural element as claimed in claim 1, characterized in that the pegs are constituted of additional plastic material introduced into the holes in connection with the laminating procedure.

4. Structural element as claimed in claim 1, characterized in that the thickness of each armature is of the same order of magnitude as the fibre-reinforced matrix layers after lamination.

5. Structural element as claimed in claim 1, characterized in that the holes in each armature are disposed in a pattern with decreasing hole spacing in the direction away from said coupling hole.

6. Structural element as claimed in claim 5, charcterized in that the decrease in the spacing of the holes changes the resilient properties of the armature gradually to values closely in agreement with the resilient properties of the laminate formed by said plastic matrix layers.

7. Structural element as claimed in claim 1, characterized in that the edge portion spaced from said coupling hole of said armature is bevelled.

8. Structural element as claimed in claim 1, characterized in that in continuation of the free end surfaces of armatures embedded within the plastic matrix layers wedges extend between adjacent fibre-reinforced plastic matrix layers for avoiding such abrupt changes of direction of the reinforcing fibres within the laminate as might endanger the strength properties thereof.

9. Structural element as claimed in claim 1, characterized in that the finished laminate with armatures embedded therein is enclosed within a clamping sleeve.

* * * * *